United States Patent [19]

Sawazaki

[11] Patent Number: 4,530,016
[45] Date of Patent: Jul. 16, 1985

[54] MAGNETIC RECORDING AND REPRODUCING APPARATUS

[75] Inventor: Norikazu Sawazaki, Yokohama, Japan

[73] Assignee: Tokyo Shibaura Denki Kabushiki Kaisha, Kawasaki, Japan

[21] Appl. No.: 513,386

[22] Filed: Jul. 13, 1983

[30] Foreign Application Priority Data

Jul. 16, 1982 [JP] Japan .................... 57-122942
Jul. 16, 1982 [JP] Japan .................... 57-122943
Nov. 9, 1982 [JP] Japan .................... 57-196377
Nov. 18, 1982 [JP] Japan .................... 57-202283

[51] Int. Cl.³ .............................. G11B 5/02
[52] U.S. Cl. ...................... 360/55; 360/134
[58] Field of Search ............. 360/55, 131, 134, 114, 360/110, 122

[56] References Cited

U.S. PATENT DOCUMENTS 3,051,943  8/1962  Simons et al. .................. 360/110
3,701,133 10/1972  Smaller et al. ................. 360/114
4,351,010  9/1982  Arai ................................ 360/134
4,442,159  4/1984  Dezawa et al. ................. 360/134

Primary Examiner—Vincent P. Canney
Attorney, Agent, or Firm—Oblon, Fisher, Spivak, McClelland & Maier

[57] ABSTRACT

Signals are recorded on a magnetic tape having a magnetic recording layer containing a magnetic material whose magnetic permeability or high frequency loss varies with a magnetic field produced therein. Changes in the permeability or high frequency loss produced according to the recording signals are converted into changes in the resonant frequency or Q of a resonant circuit, whereby a reproduced output is obtained.

21 Claims, 41 Drawing Figures

F I G. 3A 
F I G. 3B 
F I G. 4
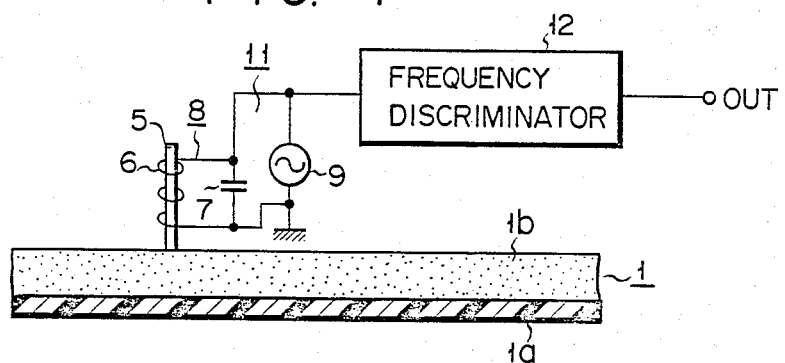
F I G. 5
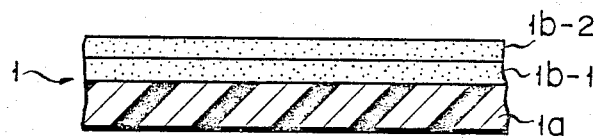
F I G. 6
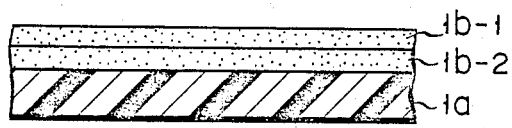

FIG. 11

MAGNETIC RECORDING AND REPRODUCING APPARATUS

BACKGROUND OF THE INVENTION

This invention generally relates to a magnetic recording and reproducing apparatus and, more particularly, to a magnetic recording and reproducing apparatus which permits high density recording and reproduction of signals.

Heretofore, the magnetic recording and reproducing apparatus has been used most extensively for an electric signal recording and reproducing system, for instance for magnetic disc, magnetic drum and magnetic tape recorders used for audio tape recorders, video tape recorders and computer data processing systems.

Such a magnetic recording and reproducing system uses a reproducing head with a ring core. The tip of the head is held in contact with a running magnetic recording medium, and an electromotive force induced in a coil wound on the ring core according to a change in a recorded magnetic field is taken out as a reproduced output. In order to be able to obtain a sufficiently large reproduced output with a satisfactory signal-to-noise ratio, it is necessary to produce a sufficiently high intensity magnetic field in the magnetic recording medium. Therefore, a wide recording track is necessary, which is undesirable from the standpoint of the high density recording of signals.

SUMMARY OF THE INVENTION

An object of the invention is to provide a magnetic recording and reproducing apparatus which permits high density and reliable recording and reproduction of signals.

According to the invention, there is provided a magnetic recording and reproducing apparatus, in which a signal is magnetically recorded on a magnetic recording medium having a magnetic material whose magnetic permeability or high frequency loss varies with a magnetic field produced therein, and during playback, changes in the magnetic permeability or high frequency loss of the magnetic material are detected as changes in the resonant frequency or Q of a high frequency resonant circuit. With this construction, a reproduced output can be obtained with high sensitivity from even a slight change in the recording field, so that reliable high density recording and reproduction of signals are possible.

BRIEF DESCRIPTION OF THE DRAWINGS

FIGS. 3A and 3B are views showing a relation between recording signals and magnetic permeability of a magnetic material of a magnetic recording medium;

FIG. 4 is a schematic view showing a different embodiment;

FIGS. 5 through 10 show different examples of the magnetic recording medium used in the magnetic recording and reproducing apparatus according to the invention;

FIG. 11 is a graph showing a relation between a high frequency loss and a high frequency field in a magnetic material of a recording medium;

DETAILED DESCRIPTION OF THE PREFERRED EMBODIMENT

The invention will now be described in conjunction with some preferred embodiments thereof with reference to the drawings.

Figure 1:
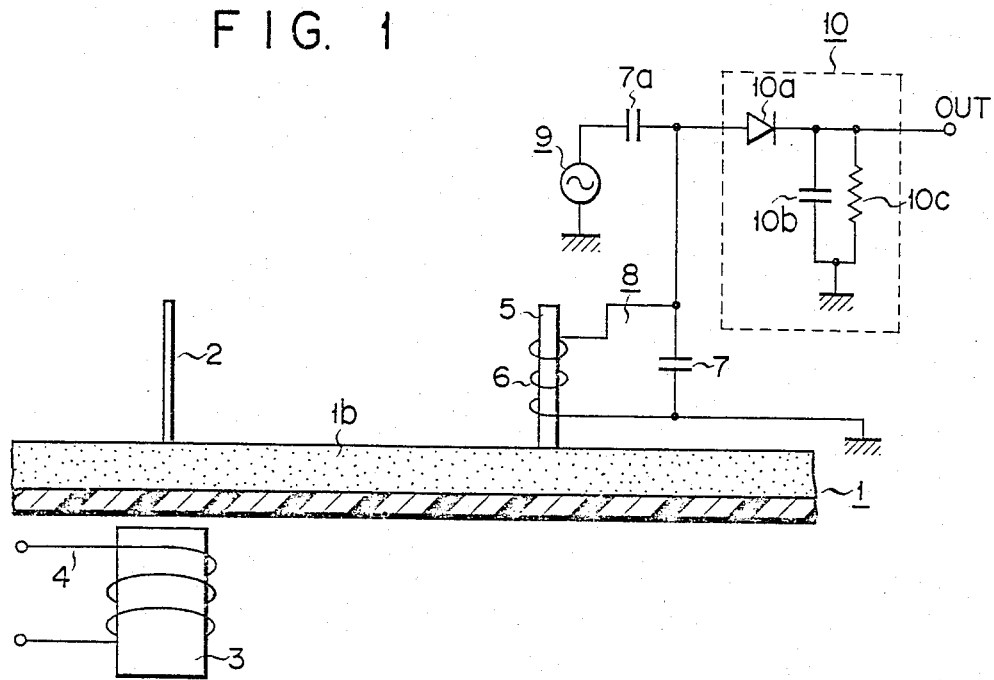
FIG. 1 is a schematic view showing one embodiment of the invention.

Referring to FIG. 1, there is shown one embodiment of the invention, which uses a magnetic tape 1 which has a synthetic resin film base 1a and a magnetic film coating 1b formed on one side of the base 1a. In this instance, the magnetic film 1b is suited for vertical magnetization recording, and consists of a magnetic material which is magnetizable by vertical magnetization, and whose magnetic permeability $\mu$ is variable according to a high frequency magnetic field produced in it. Examples of the magnetic material are mixtures of yttrium iron garnet (YIG) and powdery magnetic materials such as $\gamma$-$Fe_2O_3$ and barium ferrite. It is also possible to replace YIG with sendust.

For recording signals on the magnetic tape 1 having the structure as described, a main magnetic pole 2 consisting of a magnetic thin film having a high magnetic permeability is provided vertical to the magnetic film 1b and in contact therewith. An auxiliary magnetic pole 3 with a coil 4 wound thereon is provided on the side of the magnetic tape 1 opposite to the main pole 2. The main and auxiliary poles 2 and 3 and coil 4 constitute a vertical magnetization head.

Figure 2:
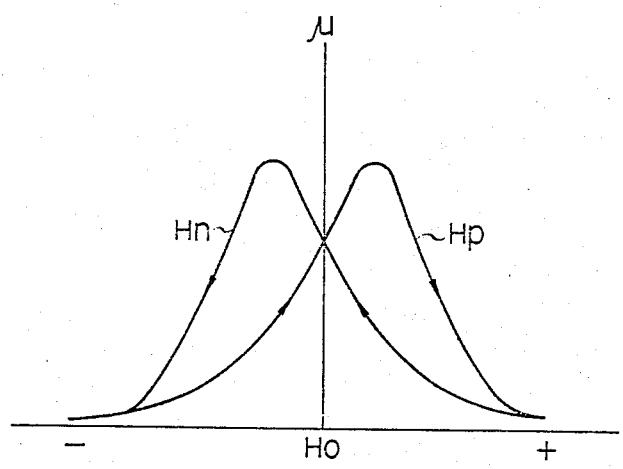
FIG. 2 is a graph showing a relation between magnetic permeability and a magnetic field.

In recording, a recording signal current is caused to flow through the coil 4. A magnetic flux is produced in the auxiliary pole 3 according to the recording signal current, and it is coupled to the main pole 2 opposing the auxiliary pole 3 via the magnetic tape 1. The main pole 2 is excited by the coupled magnetic field to provide a recording magnetic field from its tip in contact with the magnetic tape 1, whereby the magnetic film 1b is magnetized.

Where the magnetic film 1b consists of YIG, its magnetic permeability $\mu$ varies greatly with changes in the magnetic field $H_0$ in the positive and negative directions, as shown in FIG. 2. YIG has a hysteresis characteristic, so that the magnetic permeability $\mu$ is changed along a curve $H_p$ when the magnetic field is changed in the positive direction, while it is changed along a curve $H_n$ with field changes in the negative direction.

When a recording signal having a rectangular waveform as shown in FIG. 3A is supplied to the coil 4, the magnetic permeability $\mu$ of YIG constituting the magnetic film 1b is changed as shown in FIG. 3B.

The reproduction of a signal can be obtained effectively by detecting changes in the magnetic permeability $\mu$. Referring to FIG. 1 again, a reproducing head includes a magnetic core 5, which is disposed vertical to the magnetic film 1b and having its tip in contact therewith, and a coil 6 wound on the core 5. A capacitor 7 is connected across the coil 6, and it has one terminal grounded and the other terminal connected to one terminal of a high frequency oscillator 9 at 80 to 100 MHz through a coupling capacitor 7a. The other terminal of the oscillator 9 is grounded. The coil 6 and capacitor 7 constitute a resonant circuit 8, to which a high frequency signal is supplied from the oscillator 9.

A high frequency magnetic field is generated from the coil 6 by the high frequency current supplied from the oscillator 9, and is concentrated by the core 5 to be coupled to the magnetic film 1b. Since the magnetic film 1b carries the recorded signal as changes in its magnetic permeability $\mu$, the inductance L of the coil 6 is varied according to changes in $\mu$ with the movement of the magnetic tape 1 relative to the core 5. The changes in $\mu$ change the resonant frequency of the resonant circuit 8, whereby the output signal of the oscillator 9 is amplitude modulated. The amplitude modulation is detected by detecting circuit 10 which includes a diode 10a, a capacitor 10b and a resistor 10c. The detected signal component is supplied from an output terminal OUT.

In the above embodiment of FIG. 1, the fact that the high frequency signal is amplitude modulated by changes in the resonant frequency of the resonant circuit 8 is utilized for the reproduction of signals. FIG. 4 shows a different embodiment, in which oscillator 11 constitutes part of resonant circuit 8. In this instance, the oscillation frequency of oscillator 11 is varied with changes in the magnetic permeability $\mu$ or high frequency loss of the magnetic film 1b. The frequency changes are detected by a frequency discriminator 12 to obtain a reproduced signal from output terminal OUT.

It is to be appreciated that changes in the recording signal field are recorded as corresponding changes in the magnetic permeability $\mu$ of the magnetic recording medium, and that these changes in $\mu$ are reproduced in terms of changes in the amplitude or frequency of the high frequency oscillator output. A higher sensitivity of detection can thus be realized than in the prior art magnetic reproducing system in which a reproduced signal is obtained directly from changes in the magnetic field in a magnetic recording medium. In other words, the recording track width in the vertical magnetization magnetic recording and reproducing system can be substantially reduced from the value which is required in the prior art. Thus, recording and reproduction at a high density can be obtained. In addition, the high frequency oscillator supplies the energy of the reproduced output, so that it is possible to obtain a large output with an improved signal-to-noise ratio and hence, further increase the density of recording and reproduction.

It should also be noted that in a prior art magnetic recording and reproducing system using a ring core type reproducing head, the uniformity of tape speed and frequency characteristics, (for instance, in the recording of an audio signal) has been important for obtaining an output corresponding to changes in the magnetic flux in the magnetic tape. According to the present invention, however, the relation between tape speed and output does not constitute any serious problem, because the invention makes use of coil inductance changes corresponding to changes in the magnetic permeability. Thus, very satisfactory frequency characteristics of magnetic recording and reproduction can be obtained.

Further, changes in the magnetic permeability or high frequency loss of magnetic tape cause corresponding changes in the quality Q of the resonant circuit, and this has an effect of amplitude modulating the high frequency signal. It is thus possible to utilize the changes in Q to reproduce signals.

In the above embodiment, the magnetic film 1b comprised a magnetic material which is capable of magnetic recording, and whose magnetic permeability or high frequency loss varied with changes in the magnetic field. However, the film 1b may have a multi-layer structure consisting of two or more layers including a magnetic layer, which is capable of magnetic recording, and a separate magnetic layer whose permeability or high frequency loss is variable in accordance with the magnetic field applied.

FIGS. 5 through 10 show respective modifications of the magnetic tape 1 shown in FIG. 1. In the example of FIG. 5, a magnetic recording layer 1b-1 and a magnetic layer 1b-2 are used, these layers being laminated in the mentioned order on a base layer 1a of polyester, etc. The magnetic recording layer 1b-1 has the same function as that of the prior art. It consists, for example, of $\gamma$-$Fe_2O_3$ where recording is performed by lateral magnetization and of barium ferrite, cobalt-chrome, etc., where vertical magnetization recording is performed. The magnetic layer 1b-2 has such a character that its high frequency loss L changes greatly with changes in the magnetic field H, for instance as shown in FIG. 11. Typically it consists of YIG or sendust. The magnetic recording layer 1b-1 and magnetic layer 1b-2 may be interchanged as shown in FIG. 6.

Where cobalt-chrome, which has conductivity is used for the magnetic recording layer 1b-1 in the example of FIG. 6, a wear-proof insulating layer, for instance, a $Si_3N_4$ layer or lublicant layer, may be formed on its surface. Further, a YIG layer may be formed as the insulating layer.

Figure 7:
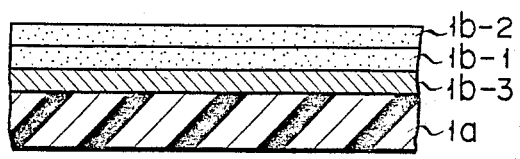
Figure 8:
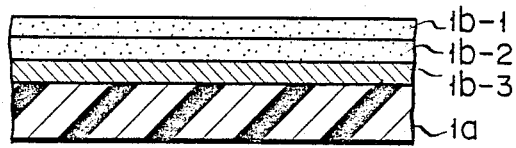
Figure 9:
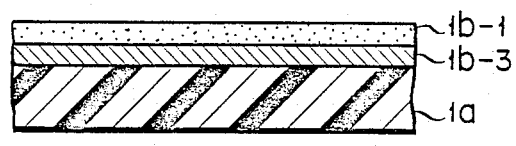

In the example of FIG. 7, a conductive thin film 1b-3 of copper, gold, Permalloy, etc. is formed on the base layer 1a, and magnetic recording layer 1b-1 and magnetic layer 1b-2 are formed in the mentioned order on the film 1b-3. The conductive thin film 1b-3 serves to reinforce the magnetic field produced by the magnetic head. Where the conductive thin film 1b-3 is made from Permalloy or like magnetic material, its high frequency loss or magnetic permeability is variable with the recording magnetic field, so that it can also serve as the magnetic layer 1b-2 with the high frequency characteristics thereof varying with the magnetic field. The magnetic tape having this structure may be used as a magnetic recording medium for vertical magnetization recording. The layers 1b-1 and 1b-2 in the example of FIG. 7 may be interchanged as shown in FIG. 8. Further, the layer 1b-2 may be omitted as shown in FIG. 9. In this case, the layer 1b-3 also serves as the layer 1b-2.

Figure 10:
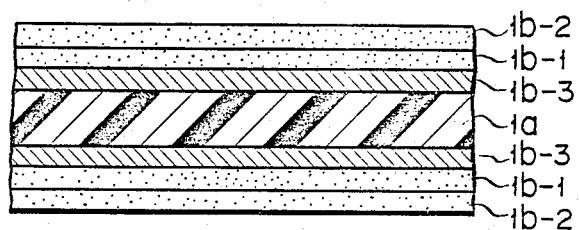

In the example of FIG. 10, the lamination of layers 1b-1, 1b-2 and 1b-3 shown in FIG. 7 is formed on each side of the base layer 1a. In this symmetrical structure, the two conductive layers 1b-3 are electrostatically coupled together to especially enhance a reproducing effect in a reproducing apparatus shown in FIG. 12, which is a different embodiment of the invention.

Figure 12:
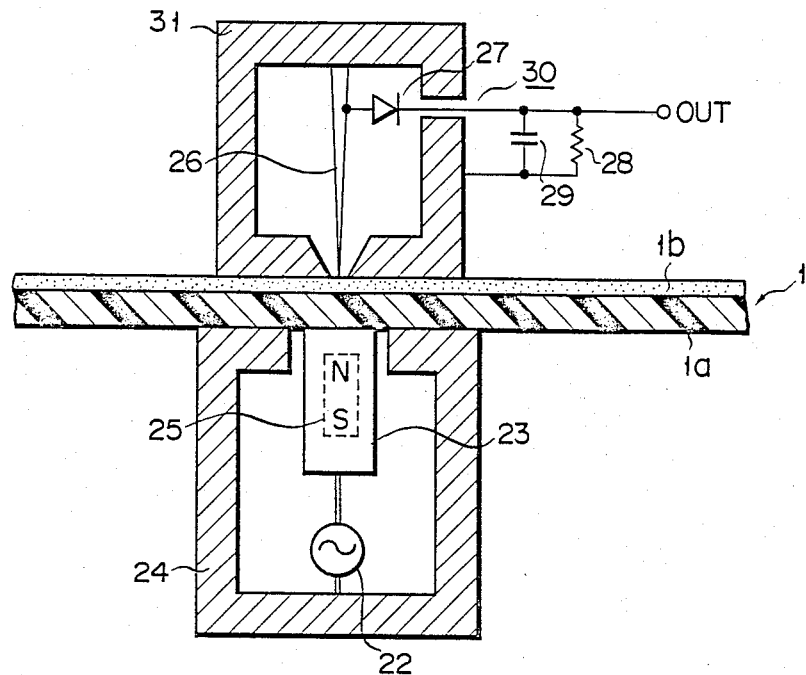
FIG. 12 is a schematic view showing a reproducing part of a further embodiment.

In the embodiment of FIG. 12, the recording of signals on the magnetic tape 1 is done using a vertical magnetization recording head as described previously in connection with FIG. 1. The recording magnetic field magnetizes the magnetic layer 1b of $\gamma$-Fe$_2$O$_3$, barium ferrite, etc. and remains in the magnetized portions of magnetic layer. This remaining recording field changes the high frequency loss and other high frequency characteristics of the magnetizable material such as YIG or sendust.

The reproducing part of this embodiment will now be described. A high frequency oscillator 22 is provided in opposition to the base layer 1a of the tape 1. A high frequency output coupling circuit 23 converts the output of the high frequency oscillator 22 into a magnetic field which is supplied to the magnetic tape 2. The oscillator 22 and coupling circuit 23 are accommodated in a shield box 24 except for a portion in contact with the tape 1. A magnet 25 is further accommodated in the shield box 24 and supplies a DC bias field to the tape 1.

On the magnetic layer side of the tape 1, a signal receiving stylus 26 of the reproducing head is disposed with its tip in contact with the magnetic layer surface of the tape 1. The stylus 26 is connected to a detecting circuit 30 including a detecting diode 27, a resistor 28 and a capacitor 29. The stylus 26 and detecting diode 27 are accommodated in a shield box 31.

In the construction described above, a high frequency signal of 100 to 1,000 MHz, for instance, is provided from the high frequency oscillator 22 and coupled to the signal receiving stylus 26 of the reproducing head via the magnetic tape 1. The high frequency loss of the magnetic layer 1b is changed according to the recording field remaining therein, so that the transmission loss is changed correspondingly. A high frequency voltage corresponding to the recording signal can thus be obtained from the receiving stylus 26 of the reproducing head. The high frequency voltage is peak-detected by the detecting circuit 30, and its changes are obtained as a reproduced output from output terminal OUT. The DC bias field supplied by the bias magnet 25 is adjusted so that the reproduced output changes greatly and also linearly.

In the reproducing system described above, the receiving stylus 26 and high frequency output coupling circuit 23 respectively correspond to the main and auxiliary magnetic poles in the usual auxiliary pole excitation type vertical magnetization recording. The system is thus effective for use with a magnetic tape having the conductive thin film shown in FIGS. 7 through 10.

Figure 13:
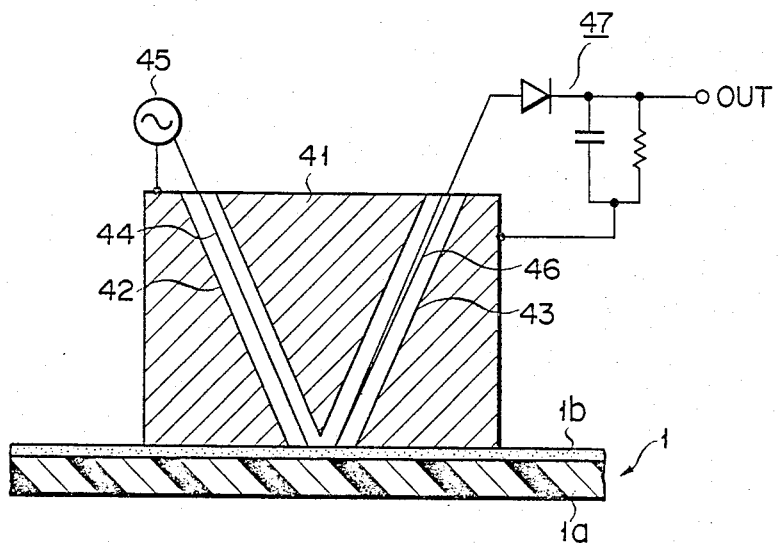
FIG. 13 is a schematic view showing a further reproducing apparatus.

FIG. 13 shows a different example of the reproducing apparatus according to the invention. In this system, the reproduction of a signal is done by detecting changes in a high frequency transmission characteristic in the direction of the plane of magnetic tape 1 due to recording field changes. Referring to the Figure, a shield conductor block 41 is provided in contact with the magnetic tape 1 which is running in a direction perpendicular to the plane of the paper. The block 41 has two through holes 42 and 43 formed in a V-shaped arrangement, these holes being open at the surface of the block in contact with the tape 1 and also at the opposite surface of the block. A high frequency wave transmission wire 44 coaxially extends through the through hole 42, and has one end in contact with the surface of the magnetic layer 1b of tape 1. The other end of the transmission wire 44 is connected to one output terminal of a high frequency oscillator 45, whose other terminal is connected to the block 41. With this arrangement, a high frequency signal can be supplied from a high frequency oscillator to the magnetic tape 1 through the transmission wire 44.

A signal receiving stylus 46 for reproduction extends through the other through hole 43, with its tip in contact with the magnetic layer 1b. On the magnetic tape 1, the tip of the signal receiving stylus 46 is spaced apart from the tip of the transmission wire by a distance less than the recording track width on the tape 1. The other end of the signal receiving stylus 46 is connected to a peak detecting circuit 47 which has the construction described earlier in connection with FIG. 12. The high frequency loss in the magnetic layer 1b of the magnetic tape 1 in the direction of the plane thereof is changed according to a recording field. A reproduced output voltage changing according to the loss can thus be obtained from the signal receiving stylus 46.

The reproducing apparatus of FIG. 13 described above is capable of reproduction from only one side of the magnetic tape 1, so that it is suited for a system which uses a rotary head assembly, such as a helical scan type video tape recorder.

Figure 14:
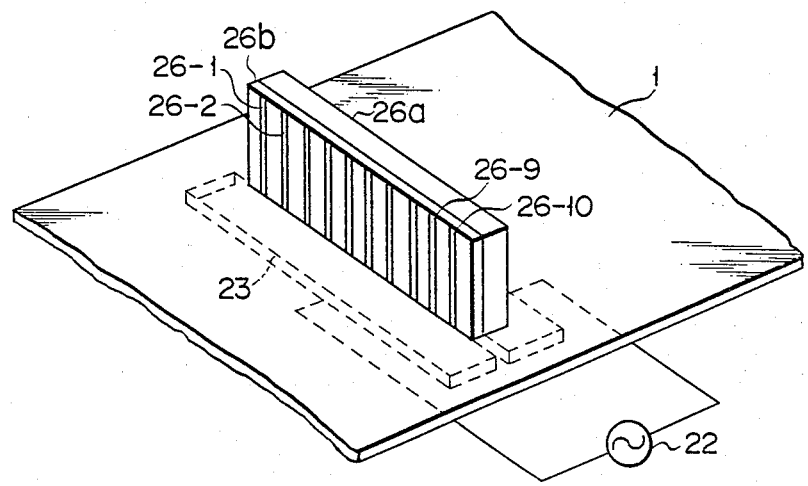
FIG. 14 through 16 show modifications of the reproducing apparatus shown in FIG. 12.

FIG. 14 shows an example of an application of the reproducing apparatus of FIG. 12 to a multi-channel reproducing head. In this apparatus, a plurality of signal receiving styli 26-1 to 26-10 for respective channels of the reproducing head are arranged in a row on the magnetic layer side of magnetic tape 1. A high frequency coupling circuit 23 which is commonly coupled to these receiving styli 26-1 to 26-10 is provided on the base layer side of tape 1. A simple multi-channel reproducing head can be obtained with this arrangement. In the example of FIG. 14, the individual styli 26-1 to 26-10 are formed in a row on a glass layer 26b which is in turn formed on a conductive substrate 26a.

Figure 15:
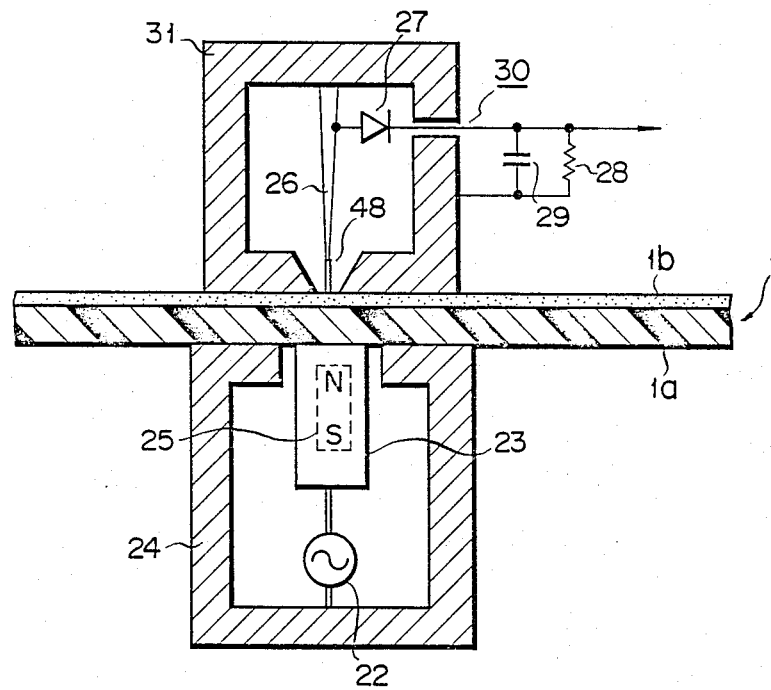
Figure 16:
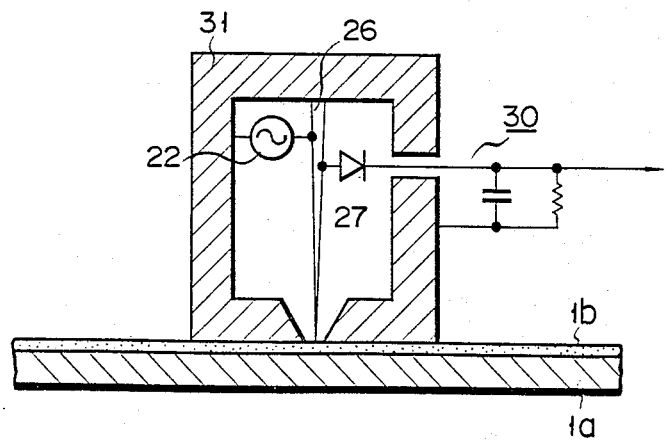

FIGS. 15 and 16 show modifications of the reproducing apparatus of FIG. 12. In FIG. 15, a magnetic material 48 whose high frequency characteristics are variable with a recording field from magnetic tape 1 is provided at the tip of signal receiving stylus 26 of the reproducing head. The variable high frequency characteristics of the magnetic tape 1 in this example can promote reproducing sensitivity.

In FIG. 16, only the reproducing part of the apparatus of FIG. 15 is shown with the high frequency oscillator 22 connected directly to the signal reproducing stylus 26 of the reproducing head. Changes in the high frequency characteristics of magnetic tape 1 cause corresponding changes in the quality Q or resonant frequency of an LC resonant circuit, which is formed by the inductance L of signal receiving stylus 26 and capacitance C between the stylus 26 and shield box 31. This is utilized for the reproduction. In this embodiment of FIG. 16, the base 1a is made of a metal such as aluminum and the base 1a of FIG. 13 embodiment may also be made of a metal.

Furthermore, although not shown, it is possible to use a signal receiving stylus similar to the stylus 26 shown in FIG. 12 in lieu of the high frequency output coupling circuit 23 in FIG. 12 with a high frequency signal supplied thereto, while using a high frequency coupling circuit on the receiving side for receiving and reproducing signals.

Figure 17:
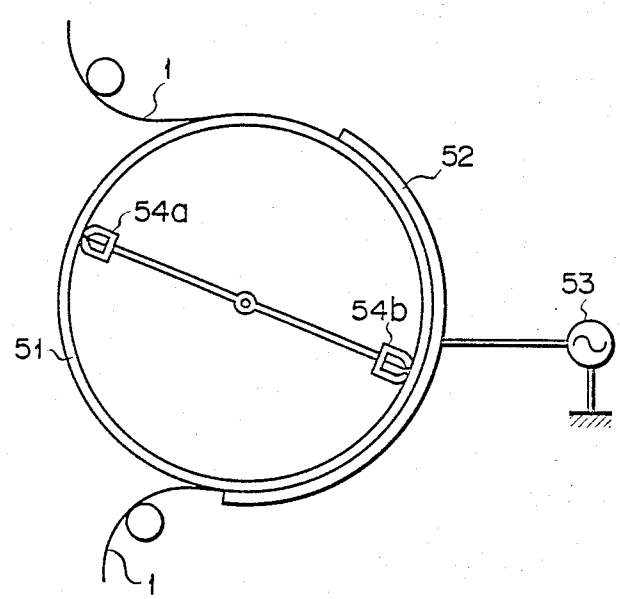
FIG. 17 is a schematic view showing an example of an application of the reproducing apparatus of FIG. 12.

FIG. 17 shows an example of an application of the reproducing system of FIG. 12 to a helical video tape recorder. A high frequency signal coupling circuit 52 is provided along the outer periphery of a cylinder 51. Magnetic tape 1 is adapted to proceed between the coupling circuit 52 and cylinder 51. A high frequency signal is supplied from a high frequency oscillator 53 to the high frequency signal coupling circuit 52. Rotary heads 54a and 54b may be as shown in FIG. 12. In this case, they may be electromagnetically coupled to the high frequency signal coupling circuit 52 via the tape 1. This arrangement also permits reproduction by a rotary head type video tape recorder.

Figure 18:
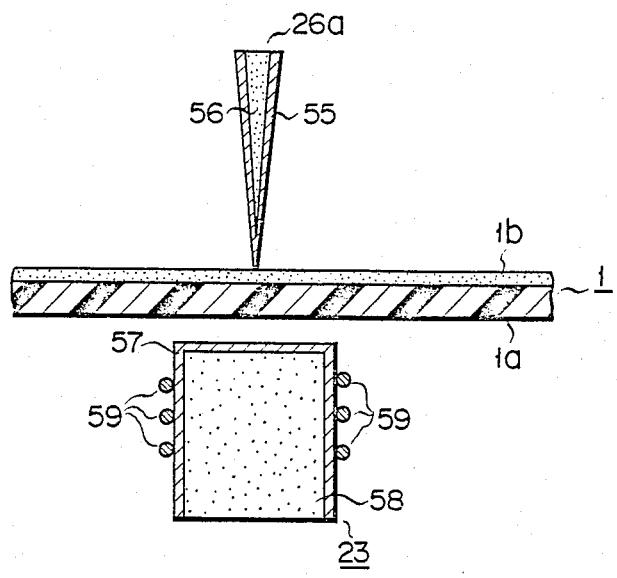
FIG. 18 is a schematic view showing a further embodiment of the invention.

FIG. 18 shows a modification of the reproducing system of FIG. 12 for use as a vertical magnetization recording head as well. In this instance, a signal receiving stylus 26a is constituted by a magnetic thin film 56 of high magnetic permeability such as Permalloy covered by a conductive film 55 of gold or the like. A high frequency signal coupling circuit 23 includes a magnetic material 58 of sendust or the like covered by a conductive film 57 of gold or the like and a coil 59, to which coil a recording signal current is supplied, wound on the magnetic material 58.

When vertical magnetization recording is performed with this structure, the magnetic material 56 of the signal receiving stylus 26a and magnetic material 58 serve as main and auxiliary poles, respectively. In reproduction, the stylus 26a and conductive film 57 of the high frequency signal coupling circuit 23 are coupled together so that a reproducing operation as described previously in connection with FIG. 12 can be obtained.

Figure 19:
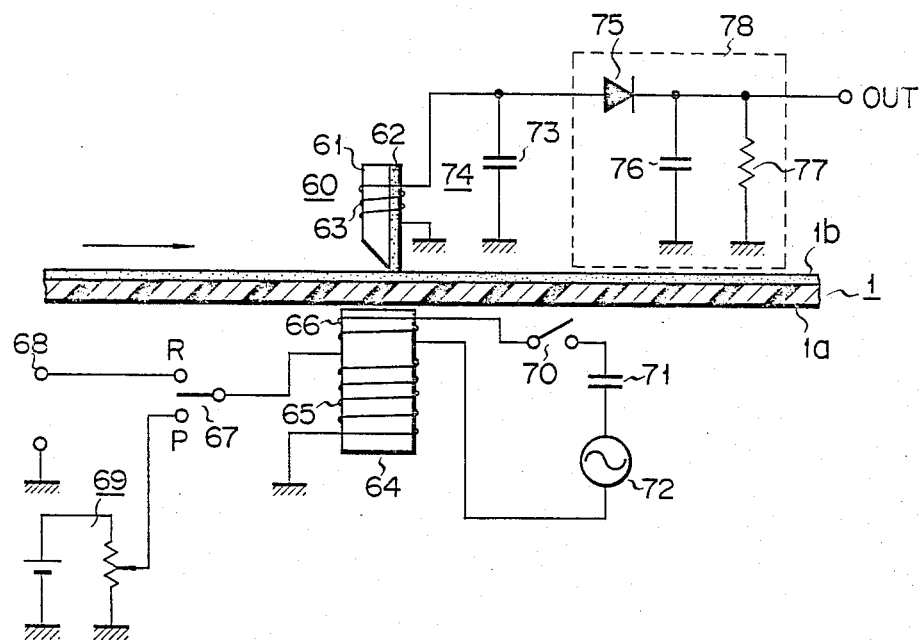
FIG. 19 is a schematic view showing a further embodiment of the invention for recording and reproduction.

FIG. 19 shows a further embodiment of the invention used for both recording and reproduction. A magnetic tape 1 is driven in the direction of the arrow. A magnetic head 60 includes a main magnetic pole, which has a ferrite substrate 61 having a tip opposing the magnetic layer 1b of tape 1 and a high magnetic permeability material such as Permalloy formed to a thickness of 0.5 to 1μ on one side of the substrate 61. The head 60 further includes a coil 63 wound on the main magnetic pole 62, an auxiliary magnetic pole 64 of ferrite or like material disposed on the side of the base layer 1a of tape 1 in opposition to the main magnetic pole 62, and coils 65 and 66 wound on the auxiliary magnetic pole 64. In recording, the coil 65 is connected to a recording signal input terminal 68 through a recording/reproduction mode selection switch 67. In reproduction, it is connected to a DC bias current source 69 through the switch 67. The coil 66 is connected, during reproduction, to a high frequency oscillator 72, which generates a high frequency signal (on the order of 80 to 100 MHz) through a switch 70, which is held "on" only in the reproduction mode, and a capacitor 71. The capacitor 71 is used for making the high frequency oscillator 72 an equivalent current source and also for cutting off the DC.

The coil 63, together with a parallel capacitor 73, forms a tuning circuit 74. The output of the tuning circuit 74 is coupled through a peak detecting circuit 78 including a diode 75, a capacitor 76 and a resistor 77 to obtain a reproduced output from a reproduced output terminal OUT.

For recording, the mode selection switch 67 is set to the recording position R while the switch 70 is turned off. In this state, a recording signal is supplied from a terminal 68 to the coil 65, producing a recording magnetic flux in the direction perpendicular to the magnetic tape 1 between the auxiliary and main magnetic poles 64 and 2. High frequency characteristic changes are recorded in the magnetic layer 1b according to the recording field.

For reproduction, the mode selection switch 67 is thrown to the reproducing position P while the switch 70 is turned on. The DC bias current is thus supplied from the current source 69 to the coil 65 while a high frequency signal is supplied from the high frequency oscillator 72 to the coil 62.

Figure 20:
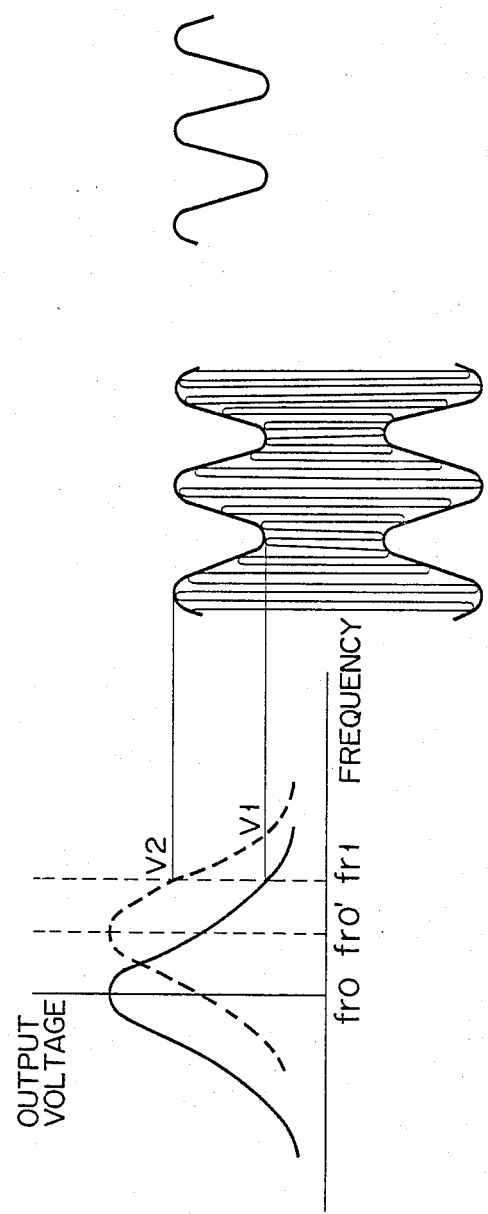
FIGS. 20A to 20C and 21A to 21C are waveform diagrams showing signals involved in the operation of the apparatus of FIG. 19.

The recording field from the magnetic layer 1b is coupled to the main magnetic pole 62 in superimposition on the DC bias field from the auxiliary pole 64 and the high frequency field. This causes variations in the permeability μ of the magnetic material 61 coupled to the main pole 22 with respect to a predetermined value corresponding to the DC bias field according to the recording field changes as shown in FIG. 2. The magnetic material 61 is capable of great variations of such as Permalloy, and Mn-Zn ferrite (single crystal or hot press material). Changes in μ cause changes in the inductance of the coil 63 to cause changes in the tuning frequency of the tuning circuit 74. The tuning frequency of the tuning circuit 74 is initially set to, for instance, $fr_0$ as shown by the solid line in FIG. 20A. With a change in the inductance of the coil 63, it is changed to $fr_0'$ as shown by the dashed line in FIG. 20A. If the frequency of the high frequency oscillator 72 is set to $fr_1$, the tuning frequency change noted above causes a change in the output voltage of the tuning circuit 74 from $V_1$ to $V_2$. The high frequency characteristics of the magnetic layer 1b are also varied with the recording field. With the high frequency characteristic variations and also variations of μ, the high frequency signal supplied to the tuning circuit 74 is amplitude modulated as shown in FIG. 20B. The amplitude modulation of the high frequency signal is fed to the peak detecting circuit 78 for peak detection, and thus a reproduced output, as shown in FIG. 20C, is obtained.

Figure 21:
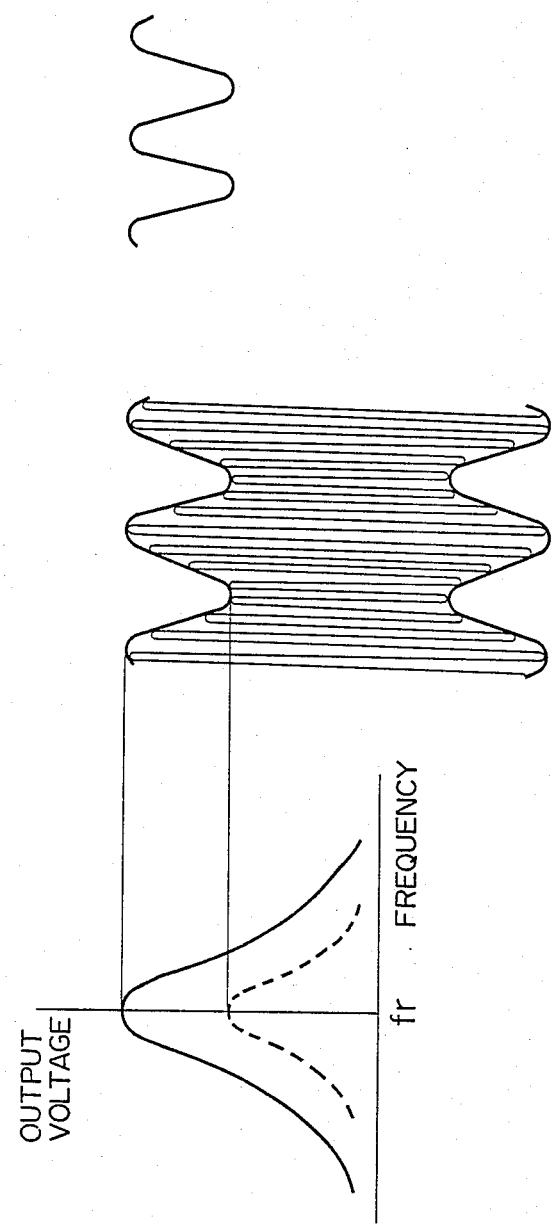

The use of a material capable of great variations in high frequency loss such as microwave ferrites (e.g., Mn-Mg ferrites, Ni-Al ferrites, YIG and their Al substitutions) and high frequency ferrites, in addition to making use of changes in the magnetic permeability of the main pole 62, permits great variations in the quality Q of the tuning circuit 74. Changes in Q cause changes in the terminal voltage of the tuning circuit 74 as shown in FIG. 21A. The high frequency signal supplied from the high frequency oscillator 72 is thus amplitude modulated according to the changes in Q as shown in FIG. 21B, whereby a reproduced output as shown in FIG. 21C is obtained through the peak detecting circuit 78.

Figure 22:
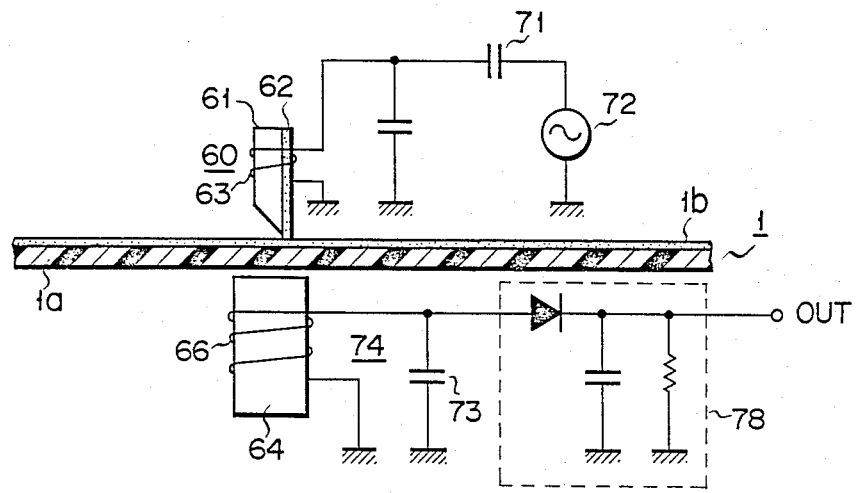
FIGS. 22 through 30 are schematic views showing further embodiments.

FIG. 22 shows a further embodiment. This embodiment is similar to the embodiment of FIG. 91. The difference resides in that a high frequency signal from a high frequency oscillator 72 is supplied to coil 63 wound on main pole 62 and a tuning circuit 74 is constituted by coil 66 wound on auxiliary pole 64 and capacitor 73. The auxiliary pole 64 consists of a magnetic material capable of great variations of the magnetic permeability μ or high frequency loss. The magnetic head 60 in this embodiment may be used as a perpendicular magnetization magnetic head as well.

Figure 23:
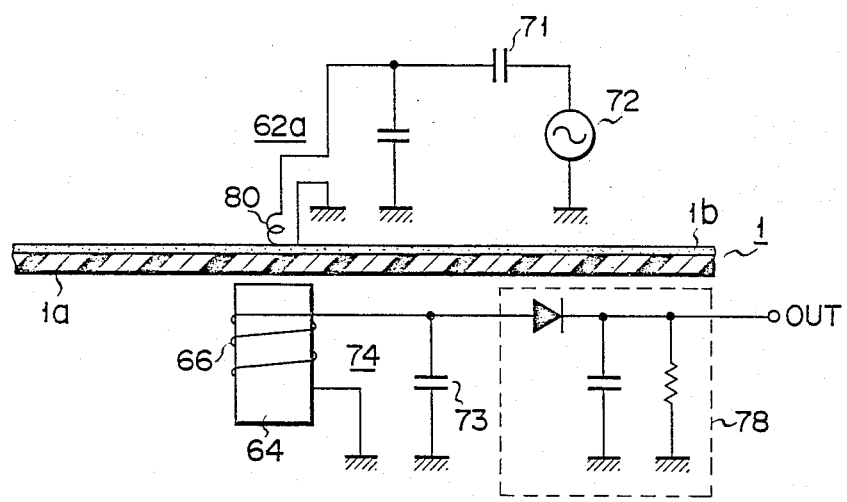

FIG. 23 shows a further embodiment, which uses a coreless coil 80 as the main magnetic pole 62a. In this event, changes in μ or in high frequency loss of the magnetic material contained in the magnetic layer 1b with recording field cause changes in the transmission loss with respect to the high frequency field applied through the coil 80. The changes in the transmission loss cause changes in the high frequency output taken out from the coil 66, whereby a reproduced output is obtained from output terminal OUT.

Figure 24:
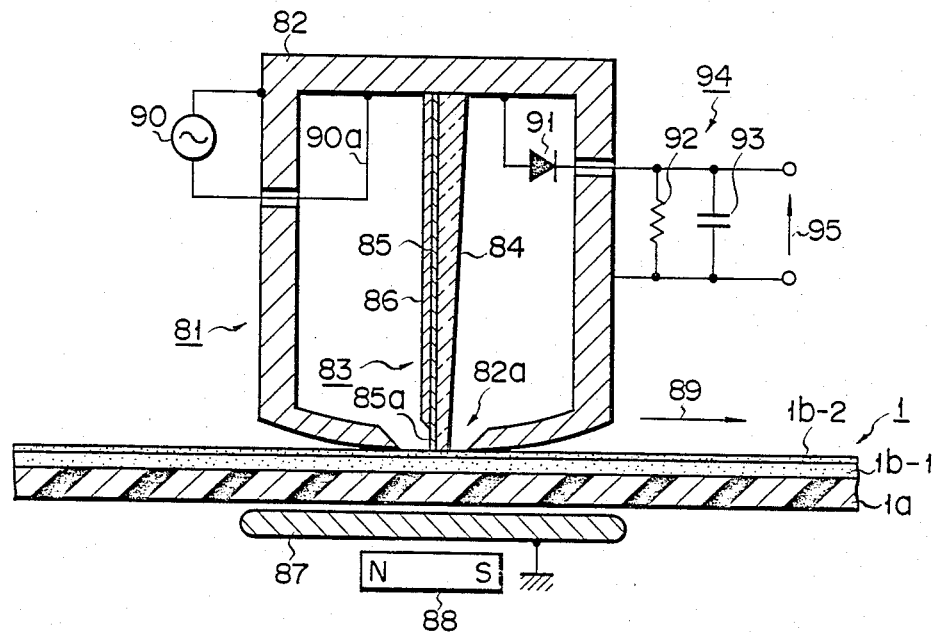

FIG. 24 shows a further embodiment. In this instance, the magnetic tape 1 shown in FIG. 5 is used. A reproducing head 81 is constituted by a cylindrical outer conductor 82 and a stylus electrode 83 as an inner conductor. The stylus electrode 83 has a stylus base 84 of glass and a tungsten film 83 which is 0.1 to 0.3μ thick formed on one side of the stylus base 83. A conductive film 86, for instance a copper film, is formed on a portion of the tungsten film 85 other than a tip portion 85a thereof to reduce the frequency loss in the former portion. The tip of the stylus electrode 83 projects from an open end 82a of the outer conductor 82 and is in contact with the surface of the magnetic layer 1b-2 of the tape 1.

A conductor 87 serving as a grounding plate is provided on the side of the tape 1 opposite to the outer conductor 82 and stylus electrode 83. A permanent magnet 88 (or an electromagnet) may be provided, if necessary, on the side of the conductor 87 opposite the tape 1. The outer conductor 82, stylus electrode 83 and conductor 87 constitute a high frequency resonant circuit in the reproducing head 5 with a resonant current path thereof extending in the direction of thickness of the tape 1.

For reproducing signals recorded on the tape 1, the reproducing head 81 is moved relative to the tape 1 in the direction of arrow 89. High frequency energy in a microwave band, for instance from about 500 MHz to about 1,000 MHz, is supplied from a high frequency oscillator 90 to the high frequency resonant circuit, i.e., coaxial resonator, through a coupling coil 90a. The high frequency characteristics of the magnetic layer 1b-2 such as high frequency loss or magnetic permeability thereof are varied according to the signal field from the tape 1. Utilization of the magnetic resonance of the magnetic material that arises from the relation between the applied high frequency energy and magnetic field permits great changes in the high frequency characteristics of the magnetic material to be obtained for utility. The high frequency voltage from the high frequency resonant circuit is modulated by the changes in either of the two high frequency characteristics. The changes in the high frequency voltage are detected by a peak detecting circuit 94 including a diode 91, a resistor 92 and a capacitor 93, whereby a reproduced output can be obtained.

In this embodiment, the level of the reproduced output 95 depends on the output energy level of the oscillator 90. Thus, a reproduced output signal having a sufficient level can be obtained with a satisfactory signal-to-noise ratio even with a small track width. Further, by reducing the thickness of the tungsten film 85 it is possible to increase the sensitivity of reproduction of signals recorded at high densities in the direction of the track length such as signals recorded by vertical magnetization recording. This permits super-high density recording and reproduction of signals, which have hitherto been impossible.

The magnetic layer 1b-2 noted previously may be readily reduced in thickness for it is formed as a surface layer of the magnetic tape 1. It is thus possible to increase the sensitivity of detection of the signal field. An oil film (not shown) may be formed on the surface of the magnetic layer 1b-2. The electrode 83 and magnetic layer 1b-2 are coupled to each other by the electrostatic capacitance due to the oil film.

Figure 25:
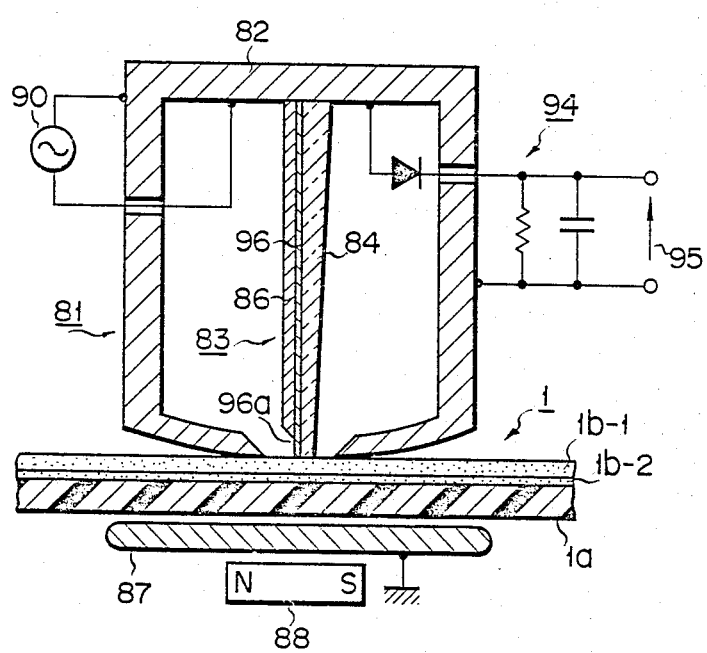

FIG. 25 shows a further embodiment, which is used with the magnetic tape of FIG. 6, having the magnetic layer 1b-2 with the high frequency characteristics thereof variable with the signal field. In addition, a magnetic film 96 of a similar magnetic material is formed in lieu of the tungsten film 85 in the embodiment of FIG. 24 on one side of the stylus substrate 84 of stylus electrode 83. Like the embodiment of FIG. 24, a conductive film 86 is formed on the portion of magnetic film 96 other than a tip portion 96a thereof for the purpose of reducing the high frequency loss. In this embodiment, the high frequency characteristics of mainly the tip portion 96a of the magnetic film 96 are varied according to the signal field from the magnetic tape 1. The changes in the high frequency characteristics cause changes the high frequency resonant circuit output voltage, these changes being similarly detected, whereby a reproduced output is obtained from the reproducing circuit 94.

Figure 26:
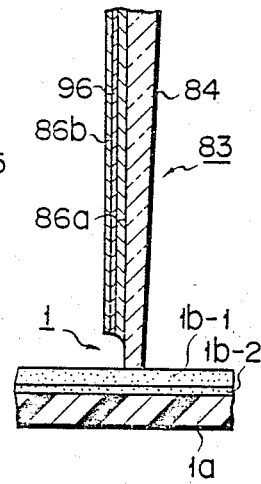

FIG. 26 shows a modification of the stylus electrode 83 shown in FIG. 25. In this example, magnetic film 96 is sandwiched between opposite side conductor films 86a and 86b.

Figure 27:
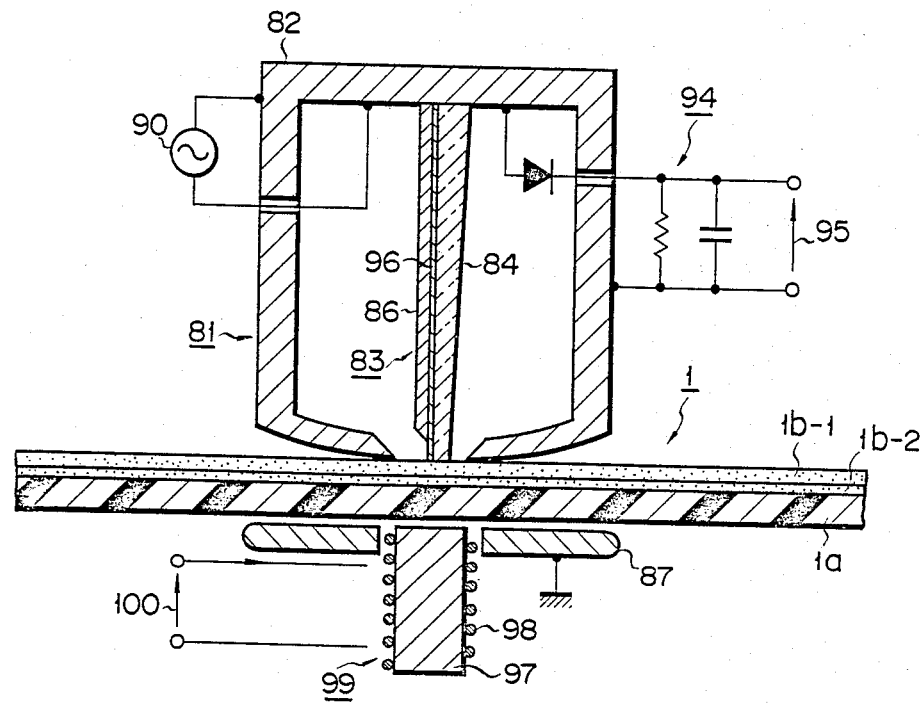
Figure 28:
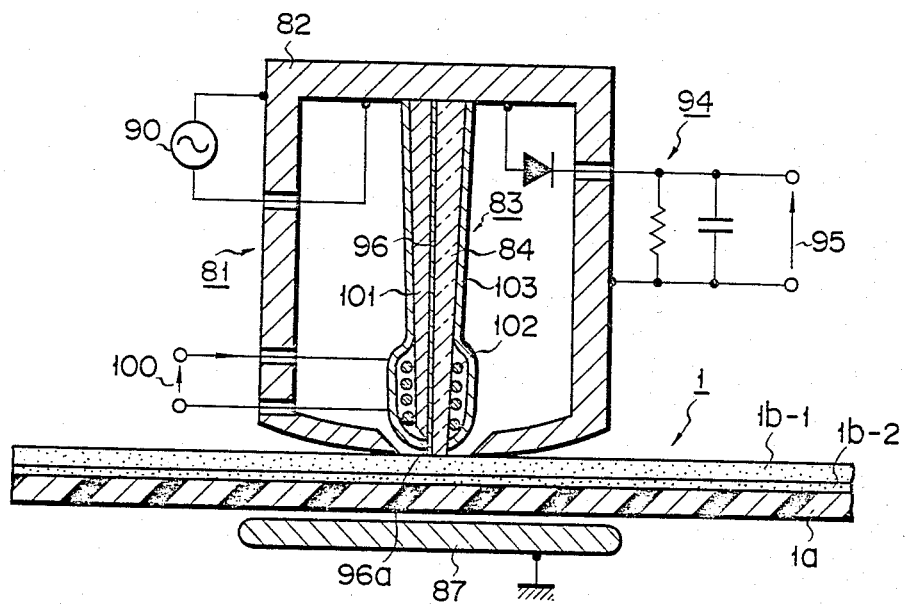

FIGS. 27 and 28 show examples of the use of stylus electrode 83 as main magnetic pole of the vertical magnetization recording head. In the example of FIG. 27, an auxiliary magnetic pole 99 including a magnetic block 97 and an exciting coil 98 wound thereon is disposed on the side of magnetic tape 1 opposite to a stylus electrode 83 having the same structure as that shown in FIG. 25. It constitutes an auxiliary pole excitation type vertical magnetization head with magnetic film 96 of the stylus electrode 83, especially consisting of Permalloy, as the main magnetic pole. The magnetic recording film 1b-1 of the magnetic tape 1 can be magnetized in the perpendicular direction (i.e., thickness direction) by supplying a recording signal current 100 to the exciting coil 98. High density recording thus can be obtained. The vertical magnetization recording head may also be used as an erasing head with an AC or DC erasing current supplied to it instead of the recording signal current.

In the example of FIG. 28, stylus electrode 83 constitutes a main pole excitation type vertical magnetization head as well. The head includes a ferrite film 101 formed on magnetic layer 96 of Permalloy or the like such that a tip portion 96a thereof is exposed for permitting reproduction. An exciting coil 102 is wound on this electrode 7, and either the recording signal current 100 or an erasing current can be supplied to the coil 102. The stylus electrode 83 is shielded by a copper film 103 except for the tip portion 96a of the magnetic film 96 to prevent undesirable high frequency loss in the stylus electrode 83 during reproduction.

In this embodiment, part of the reproducing head can be used as vertical magnetization recording head or erasing head.

Figure 29:
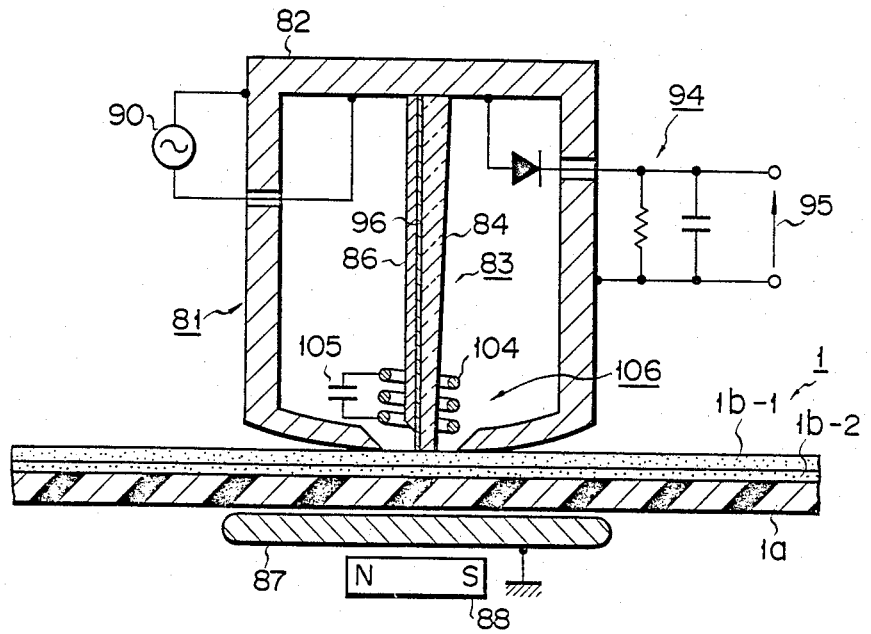

FIG. 29 shows a further embodiment, which includes an auxiliary resonant circuit 106. The auxiliary resonant circuit 106 has a coil 104 wound on stylus electrode 83, preferably in the neighborhood of the tip thereof, and a capacitor 105 connected in parallel with the coil 104. High frequency energy from oscillator 90 is supplied to the auxiliary resonant circuit for resonance, thereby improving the sensitivity of reproduction. In this embodiment, a strong magnetic field that is produced with the high frequency energy supplied to the auxiliary resonant circuit 106 is applied along with the signal field from the magnetic tape 1 to the magnetic film 96. Therefore, changes in the high frequency loss due to the magnetic resonance absorption by the magnetic film are augumented to increase the reproduced output 95. Experiments conducted by the inventor prove that the reproduced output signal is improved by substantially 10 times as compared to the device without the auxiliary resonant circuit 106.

Instead of providing the conductor 87 on the side of the magnetic tape 1 opposite the stylus electrode 83, a conductive material may be incorporated in the tape 1. As a further alternative, a conductive layer 1b-3 may be provided in lamination with the magnetic recording film 1b-1 as shown in FIG. 7 to impart the tape 1 with conductivity. Where the magnetic tape 1 has a conductive surface, an insulating film such as an oil film may be provided on the conductive surface to avoid electric contact of the stylus electrode 83 with the conductive surface. The electrostatic capacitance that is provided by the insulating layer as an inter-layer dielectric may be included in a high frequency resonant circuit.

Figure 30:
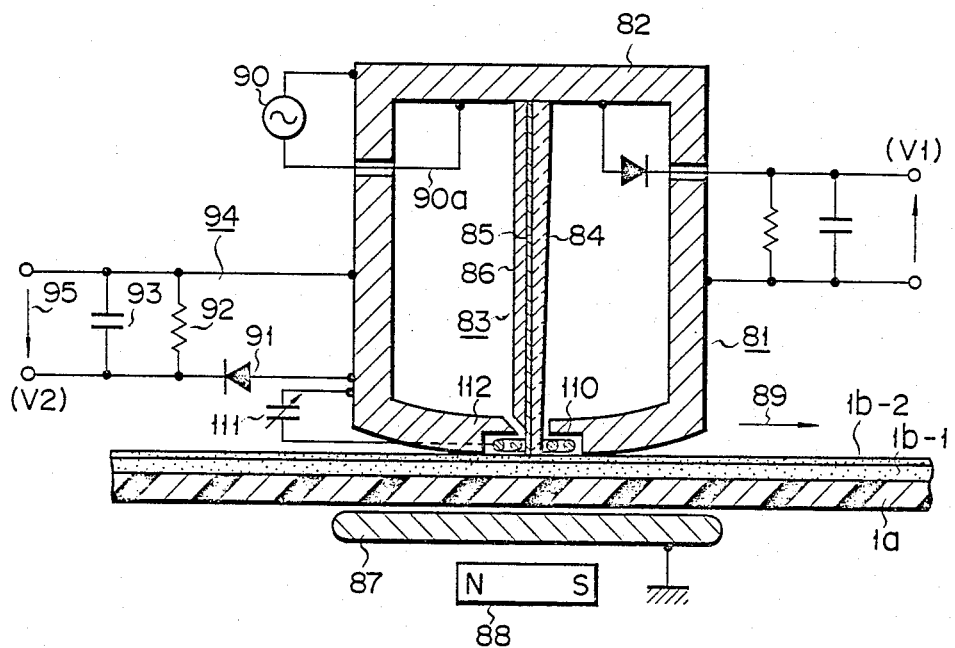

FIG. 30 shows a further embodiment. In this embodiment, a second coupling coil 110 is wound on a tip portion of the stylus electrode 83 which has the same structure as that in the embodiment of FIG. 24. The second coupling coil 110 has one end connected to the outer conductor 82 and the other end connected thereto through a resonant capacitor 111. It is substantially free from electric coupling to the coaxial resonator due to the presence of an electric shield 112 provided at the end of the outer conductor 82 adjacent to the tape 1.

The coaxial resonator and second coupling coil 110 constitute, along with input coupling coil 90a, a high frequency coupling circuit, in which the magnetic layer 1b-2 is a coupling element.

For reproducing the signal recorded on the magnetic tape 1, the reproducing head 81 is moved relative to the tape 1 in the direction of arrow 89 while supplying high frequency energy from the high frequency oscillator 90 to the high frequency coupling circuit through the input coupling coil 90a. The high frequency characteristics of the magnetic layer 1b-2, such as high frequency loss or magnetic permeability, vary according to the signal field from the magnetic tape 1. In particular, the relation between the signal field and frequency of the high frequency energy is suitably selected so as to cause magnetic resonance by the magnetic layer 1b-2 or the signal field. The tensor magnetic permeability is greatly varied by the magnetic resonance. With this magnetic resonance the magnetic film 1b-2 is coupled to the stylus electrode 83 and second coupling coil 110. In other words, the degree of electromagnetic coupling of the high frequency coupling circuit is increased from zero according to the signal field.

With the changes in the electromagnetic coupling degree the high frequency output appearing at the output of the coaxial resonator is modulated according to the signal field. The changes in the high frequency output are detected by the peak detecting circuit 94, whereby the reproduced output 95 can be obtained.

Figure 31:
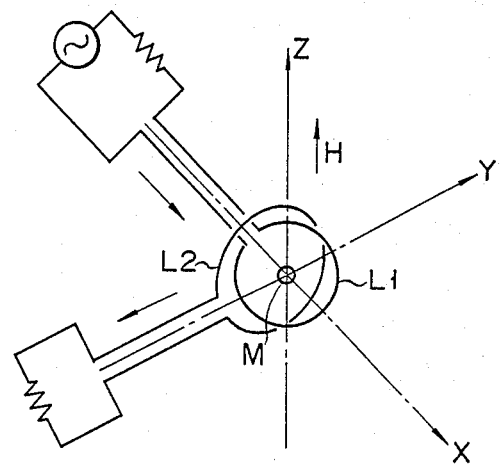
FIG. 31 is a view illustrating the principles underlying the embodiment of FIG. 30.

The principles of reproduction utilizing the magnetic resonance noted above will now discussed with reference to FIG. 31. The set-up of FIG. 31 has two loop coils L1 and L2 which are disposed such that their loop planes are normal to two perpendicular axes X and Y. A magnetic member M consisting of a magnetic resonance material (e.g., YIG) is disposed at the intersection of the axes X and Y. An external field H is applied to the magnetic member M in a direction Z parallel to both the loop coils L1 and L2, i.e., normal to the axes X and Y, while a microwave at the frequency of the magnetic resonance determined by the applied field is applied to the loop coil L1. Consequently, the magnetic moment of the magnetic member M causes a precession about the axes X and Y. The tensor permeability of the magnetic member M is thus increased so that the loop coil L1 is coupled to the other coil L2, whereby the microwave is transmitted from the former coil to the latter. It will be seen that the degree of coupling between both the loop coils L1 and L2 is varied according to the intensity of the field H.

Figure 32:
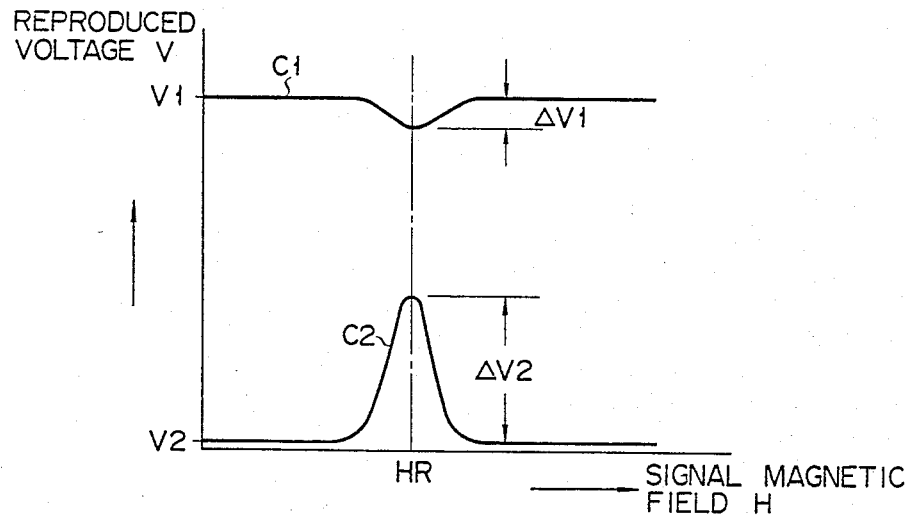
FIG. 32 is a graph illustrating the reproducing characteristic of the embodiment of FIG. 30.

Obviously, the reproduction of signal can be obtained by detecting the changes in the high frequency output voltage which correspond to the changes in the coupling degree of the high frequency coupling circuit. FIG. 32 shows the relation between the reproduced output voltage V and signal field H. A characteristic of curve C1 results without the second coupling coil 110, i.e., in case where changes in the coupling degree according to the signal field H are not utilized. Curve C2 represents the reproduction characteristics that are obtainable by utilizing the coupling degree changes with the signal field H. With the characteristic C1, the reproduced output level change corresponding to $H=H_R$ ($H_R$ being a field level that can cause magnetic resonance) with respect to output level V1 corresponding to $H=0$ is $\Delta V1/V1$, whereas with the characteristic C2 the reproduced output level change corresponding to $H=H_R$ with respect to output level V2 corresponding to $H=0$ is $\Delta V2/V2$. The latter is far greater than the former. Where the coupling degree is not utilized, the resonators Q must be increased to increase the reproduction sensitivity. This gives rise to noise due to variations of the resonant point of the resonator and mechanical vibrations of the recording medium, magnetic head and reproducing head. Also, the signal-to-noise ratio of the reproduced output is reduced with the reduction of the C/N of the high frequency output.

According to this embodiment, a large output can be obtained owing to the utilization of great changes of the coupling degree of the high frequency resonant circuit. In addition, the coaxial resonator constitutes a high frequency coupling circuit through a magnetic material capable of magnetic resonance, so that it is possible to reduce noise due to variations of the resonant point and mechanical vibrations and also to reduce the influence of the C/N of the high frequency output on the signal-to-noise ratio of the reproduced output.

Figure 33:
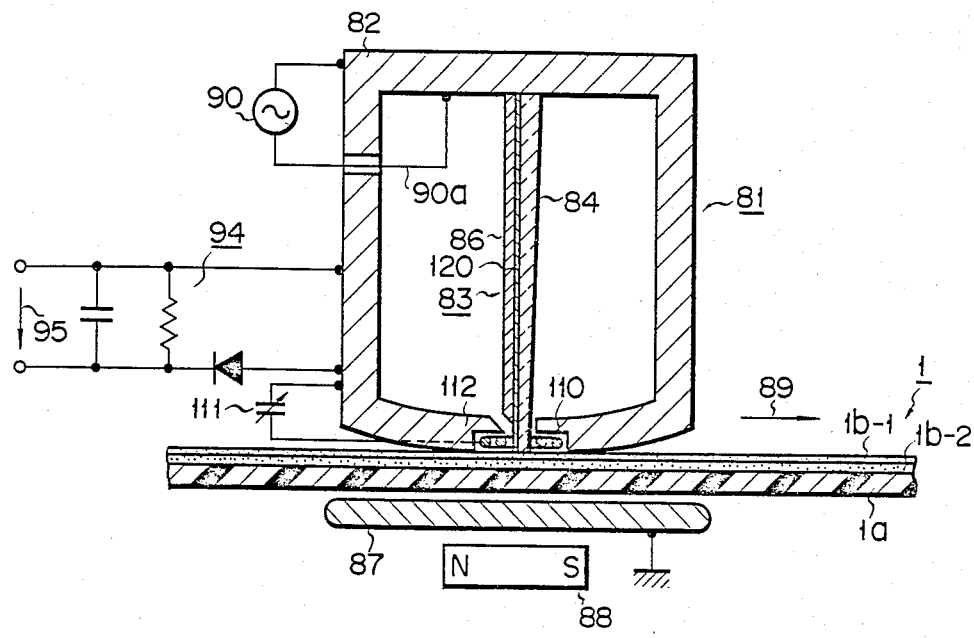
FIGS. 33 through 36 are schematic views showing further embodiments.

FIG. 33 shows a further embodiment. In this case, a magnetic tape 1 as shown in FIG. 6, having the magnetic layer 1b-2 whose high frequency characteristics are variable with the signal field, is used. Also, a magnetic film 120 is formed in lieu of the tungsten film 85 on one side of the stylus substrate 84 of stylus electrode 83. Conductive film 86 is again formed on the surface of the magnetic film 120 other than at a tip portion thereof to reduce the high frequency loss. The signal field from the magnetic tape 1 causes changes in the high frequency characteristics of the magnetic layer 1b-2 and mainly the top portion of the magnetic film 120. With these changes the coupling degree of the high frequency coupling circuit is varied to vary the high frequency output voltage of the coaxial resonator. The changes in the high frequency output voltage are detected in the manner as described, whereby a reproduced output can be obtained from detecting circuit 94.

Figure 34:
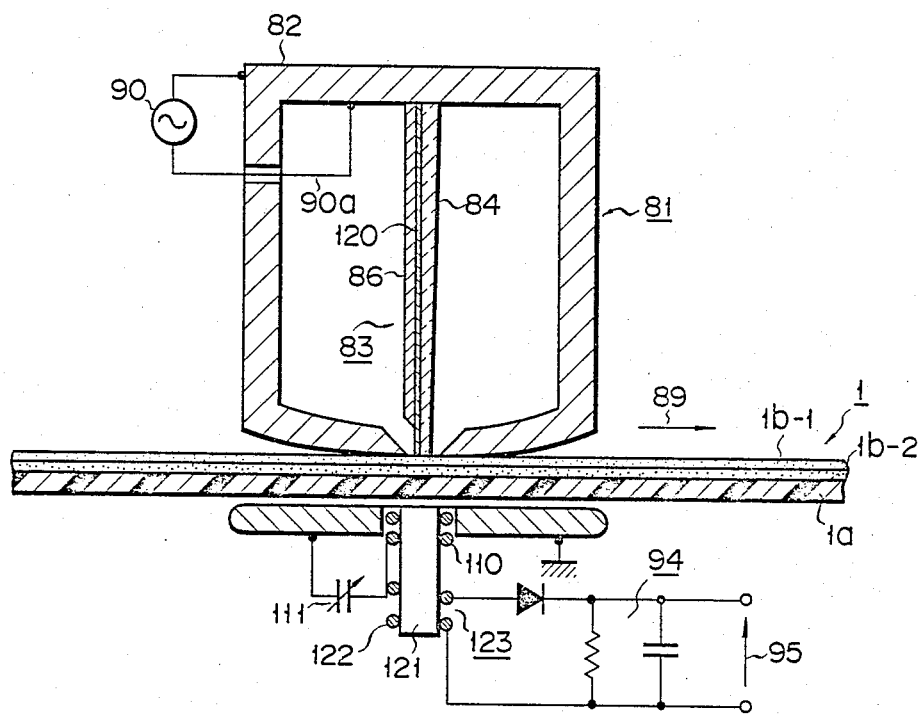
Figure 35:
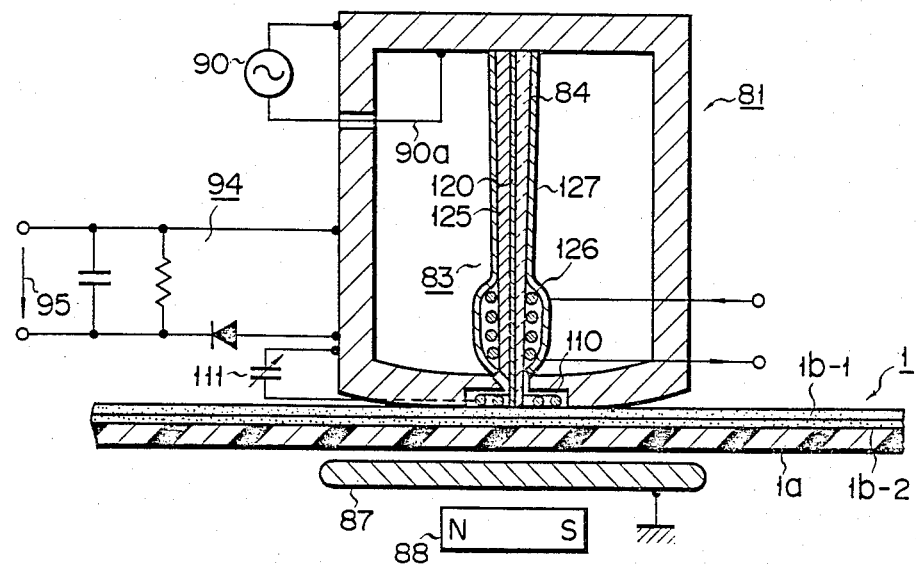

FIGS. 34 and 35 show further embodiments, in which the stylus electrode 83 can serve as the main magnetic pole of the vertical magnetization recording head as well. In the example of FIG. 34, an auxiliary pole excitation type vertical magnetization recording head is used, which includes an auxiliary magnetic pole 123 disposed on the side of magnetic tape 1 on the side opposite to and in opposition to stylus electrode 83 of the structure as shown in FIG. 33 and including a magnetic block 121 and a coil 122 wound thereon, the main magnetic pole of which is constituted by a magnetic film 120 (preferably of Permalloy) of the stylus electrode 83.

In recording, a recording signal current is supplied to the coil 122 to magnetize the magnetic recording layer 1b-1 of the tape 1 in the vertical direction (i.e., thickness direction), whereby high density recording can be obtained. The vertical magnetization recording head may be used as an erasing head as well by supplying an AC or DC erasing current instead of the recording signal current. In this embodiment, a second coupling coil 110 is wound on the magnetic block 121.

In the embodiment of FIG. 35, stylus electrode 83 constitutes a main pole excitation vertical magnetization recording head. A ferrite film 125 is formed on magnetic film 120 of Permalloy or the like except for a portion thereof necessary for the reproduction. A coil 26 is wound on this structure, and either a recording signal current or an erasing current can be supplied to the coil 126. Preferably, the magnetic film 120 of the stylus electrode 83 is magnetically shielded except for its tip portion by means of a copper film 127 to prevent the adverse influence of high frequency loss in the stylus electrode 83 during reproduction.

Figure 36:
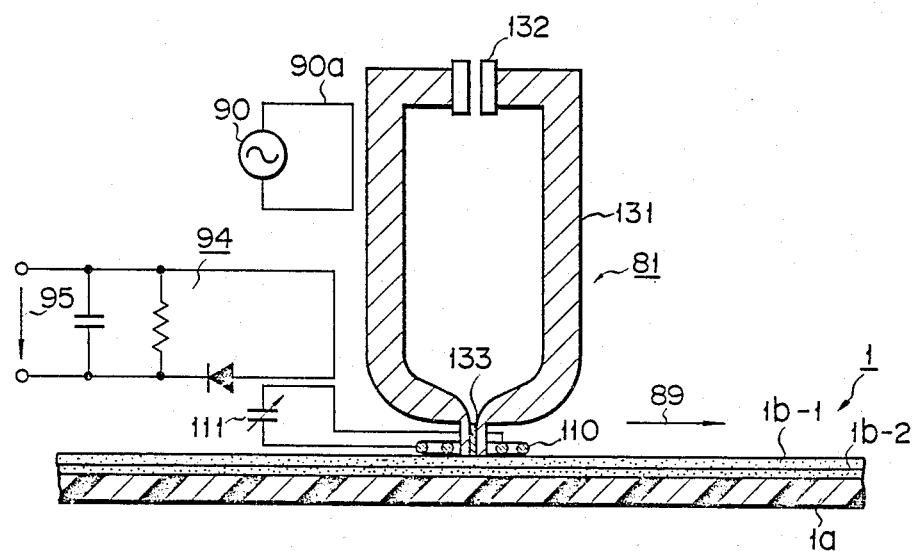

FIG. 36 shows a further embodiment, in which a parallel line resonator 131 is used in lieu of coaxial resonator. A magnetic film 133 of Permalloy or the like, having its high frequency characteristics variable according to a signal field from magnetic tape 1, is provided at the tip of the resonator 131 opposing the tape 1. A second coupling coil 110 is wound on the magnetic film 133. The resonator 131 has a resonant capacitor 132. Again in this embodiment, high sensitivity reproduction is possible, in contrast to the case where the second coupling coil 110 is not used.

In this embodiment, the magnetic resonance is utilized as a magnetic characteristic of the magnetic material that is variable with the signal field. It is also possible to utilize high frequency, low intensity field loss to vary the coupling degree of the high frequency coupling circuit for reproduction. With a magnetic recording medium using, for instance, barium ferrite as a magnetic recording layer, a function of varying the coupling degree of the high frequency coupling circuit together with its changes in characteristics according to the signal field can also be provided.

What is claimed is:

1. A magnetic recording and reproducing system comprising:
   a magnetic recording medium containing a magnetic material with at least either magnetic permeability or high frequency loss thereof variable with variations of the magnetic field in it;
   means for magnetically recording signals on said magnetic recording medium;
   a high frequency resonant circuit with at least either resonant frequency or Q thereof being variable with variations of at least either magnetic permeability or high frequency loss of a magnetic material variable according to recording signals; and
   means for obtaining a reproduced output according to the output of said high frequency resonant circuit.

2. The magnetic recording and reproducing system according to claim 1, wherein said magnetic recording medium includes:
   a base layer;
   a magnetic layer formed on said base layer and containing a magnetic recording material magnetizable according to recording signals and said magnetic material.

3. The magnetic recording and reproducing system according to claim 1, wherein said magnetic recording medium includes:
   a base layer;
   a magnetic recording layer formed on said base layer and magnetizable according to recording signals; and
   a magnetic layer formed on said magnetic recording layer and consisting of said magnetic material.

4. The magnetic recording and reproducing system according to claim 1, wherein said magnetic recording medium includes:
   a base layer;
   a conductive thin film formed on said base layer;
   a magnetic recording layer;
   a magnetic material layer; and
   said magnetic recording layer and magnetic material layer being laminated in a predetermined order on said conductive thin film, said magnetic recording layer consisting of a magnetic recording material magnetizable according to recording signals, and said magnetic material layer consisting of a magnetic material whose high frequency characteristics are variable with a recording magnetic field.

5. The magnetic recording and reproducing system according to claim 1, wherein said high frequency resonant circuit includes:
   a high frequency oscillator; and
   means for obtaining a high frequency magnetic field corresponding to a high frequency signal from said high frequency oscillator through said magnetic recording medium.

6. The magnetic recording and reproducing system according to claim 1, wherein said high frequency resonant circuit includes:
   high frequency signal producing means provided on one side of said magnetic recording medium;
   signal receiving means provided on the other side of said magnetic recording medium in opposition to said high frequency signal providing means; and
   changes in the high frequency transmission characteristic of said magnetic recording medium with a vertical recording field being detected from the output of said signal receiving means to obtain a reproduced output.

7. The magnetic recording and reproducing system according to claim 1, wherein said high frequency resonant circuit includes:
   high frequency signal providing means provided on one side of said magnetic recording medium; and
   signal receiving means provided on said one side of said magnetic recording medium, for receiving a high frequency signal having a component representing changes in the high frequency transmission characteristic of said magnetic recording medium with a recording field in the direction of the plane of said magnetic recording medium.

8. The magnetic recording and reproducing system according to claim 1, wherein said high frequency resonant circuit includes:
an additional magnetic material member provided on one side of said magnetic recording medium and consisting of a magnetic material with at least magnetic permeability thereof variable with changes in the magnetic field therein;
means for applying a high frequency magnetic field to said additional magnetic material member from said one side of said magnetic recording medium; and
signal receiving means for receiving changes in the high frequency magnetic field through said magnetic recording medium and additional magnetic material member.

9. The magnetic recording and reproducing system according to claim 8, wherein said means for recording signals in said magnetic recording medium includes:
a main magnetic pole provided on a magnetic surface side of said magnetic recording medium;
an auxiliary magnetic pole provided on the side of said magnetic recording medium opposite said main magnetic pole;
a coil wound on said auxiliary magnetic pole, for being supplied with recording signals;
either said main or auxiliary magnetic pole consisting of said additional magnetic material member with at least either magnetic permeability or high frequency loss thereof varying with changes in the magnetic field therein; and
said high frequency resonant circuit includes:
a first coil coupled to the other magnetic pole than said pole consisting of said additional magnetic material member,
means for supplying a high frequency current to said first coil,
a second coil wound on said magnetic pole consisting of said additional magnetic material member; and
the output of said high frequency resonant circuit being taken out from said second coil.

10. The magnetic recording and reproducing system according to claim 1, wherein said high frequency resonant circuit includes a reproducing head including:
a stylus electrode having a top in contact with one side surface of said magnetic recording medium; and
a conductor provided on the other side of said magnetic recording medium in opposition to said stylus electrode.

11. The magnetic recording and reproducing system according to claim 10, wherein said magnetic recording medium includes a conductive layer formed on the side of said medium in contact with said stylus electrode.

12. The magnetic recording and reproducing system according to claim 10, wherein said stylus electrode includes:
an insulating stylus base;
a magnetic film provided on one side of said insulating stylus base and having high frequency characteristics which are variable with a signal magnetic field; and
a conductive film formed on the surface of said magnetic film other than a portion thereof corresponding to the top of said stylus electrode.

13. The magnetic recording and reproducing system according to claim 12, wherein said high frequency resonant circuit includes:
an auxiliary resonant circuit coupled to said stylus electrode;
means for supplying high frequency energy to said auxiliary resonant circuit;
means for generating a high frequency magnetic field from a resonant current in said auxiliary resonant circuit; and
said high frequency magnetic field being supplied to said magnetic film.

14. The magnetic recording and reproducing system according to claim 13, wherein said auxiliary resonant circuit includes:
a coil wound on said stylus electrode; and
a capacitor connected to said coil.

15. The magnetic recording and reproducing system according to claim 1, wherein said magnetic recording medium includes an insulating surface layer, said high frequency resonant circuit including an electrostatic capacitance formed by said insulating surface layer.

16. The magnetic recording and reproducing system according to claim 10, wherein said stylus electrode also constitutes an auxiliary pole excitation type vertical magnetization head together with a secondary magnetic pole provided with an exciting coil on the opposite side of said magnetic recording medium.

17. The magnetic recording and reproducing system according to claim 10, wherein said stylus electrode has an exciting coil and also constitutes a main magnetic pole of a main pole excitation type vertical magnetization head.

18. The magnetic recording and reproducing system according to claim 1, wherein said high frequency resonant circuit includes:
a high frequency coupling circuit whose degree of coupling thereof varies with changes in high frequency characteristics of said magnetic material; and
said reproduced output obtaining means obtaining said reproduced output from changes in the coupling degree of said high frequency coupling circuit.

19. The magnetic recording and reproducing system according to claim 18, wherein high frequency resonant circuit includes means for supplying high frequency energy into said high frequency coupling circuit.

20. The magnetic recording and reproducing system according to claim 18, wherein the coupling degree of said high frequency coupling circuit varies according to ferromagnetic resonance absorption by a magnetic material whose high frequency characteristics vary with said magnetic field.

21. The magnetic recording and reproducing system according to claim 20, wherein said high frequency coupling circuit provides a low degree of electromagnetic coupling as an electric circuit in the absence of a signal and provides a high degree of electromagnetic coupling with the ferromagnetic resonance of the magnetic material.

* * * * *